March 7, 1950 T. T. N. BUCHER 2,499,568

BALANCED MODULATION

Filed March 1, 1948 2 Sheets-Sheet 1

INVENTOR
THOMAS T. N. BUCHER
BY Harry Tonick
ATTORNEY

March 7, 1950 T. T. N. BUCHER 2,499,568

BALANCED MODULATION

Filed March 1, 1948 2 Sheets-Sheet 2

INVENTOR
THOMAS T. N. BUCHER
BY [signature]
ATTORNEY

Patented Mar. 7, 1950

2,499,568

UNITED STATES PATENT OFFICE 2,499,568

BALANCED MODULATION

Thomas T. N. Bucher, Moorestown, N. J., assignor to Radio Corporation of America, a corporation of Delaware Application March 1, 1948, Serial No. 12,451

7 Claims. (Cl. 332—41)

In this application, I disclose a new and improved modulator of the balanced type.

The term "balanced modulator" is used here in a substantially conventional manner. In my improved modulator, two carriers or recurring pulses of like frequency are applied to a tube's electrodes and the circuit so arranged and adjusted that for critical values of the carriers or potentials, their effects on the tube's output compensate. Then the carrier or pulse magnitudes are relatively varied to unbalance the operation and provide output. In the embodiment described, balance is attained at zero or no modulation so that I produce balanced carrier suppressed modulation.

In describing this balanced modulator, reference is made to pulse energy to be modulated and also to energy of substantially sine wave form and carrier wave frequency which is modulated. In an application, pulses were modulated for radar use. However, the modulator is not limited to such use but may be used in the usual balanced modulation applications. For example, it may be used in carrier suppression systems using single side band transmission and in various automatic direction finder applications such as described by D. S. Bond's "Radio Direction Finders," page 173. It may be used in carrier telephony work and in the automatic frequency control circuits in FM systems and in carrier suppression modulators where an augmented carrier properly phased is added.

The general purpose of my invention is to provide a simple circuit for producing balanced modulation and in particular, for producing balanced modulation for video pulses.

Figure 1:
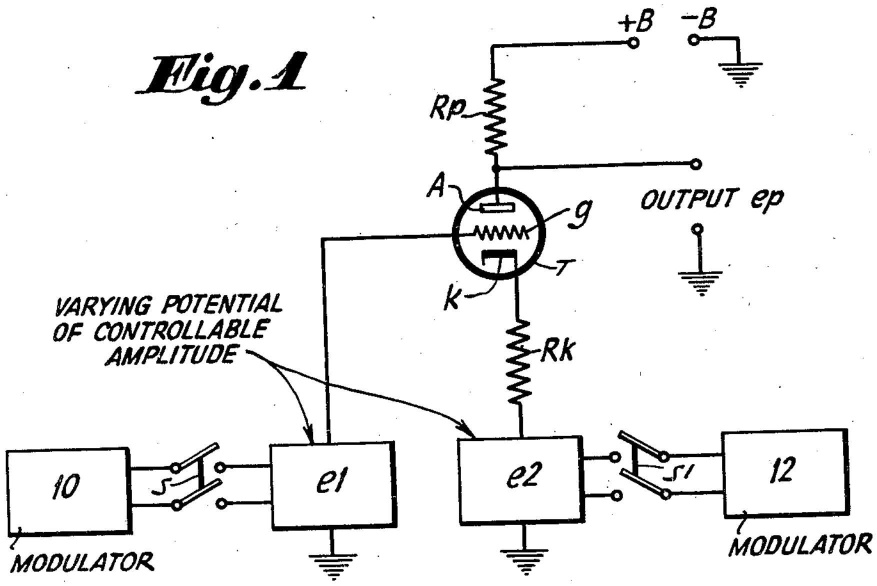
Figure 4:
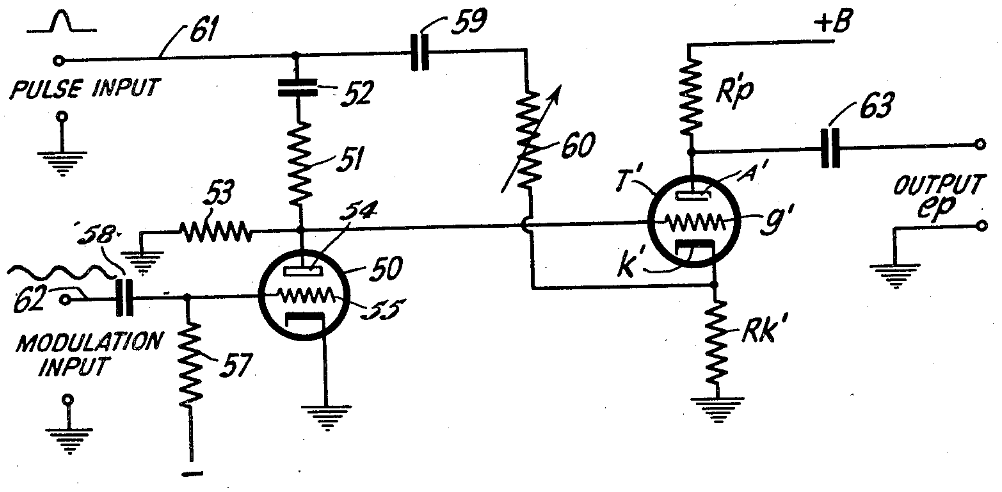
Figures 2, 3:
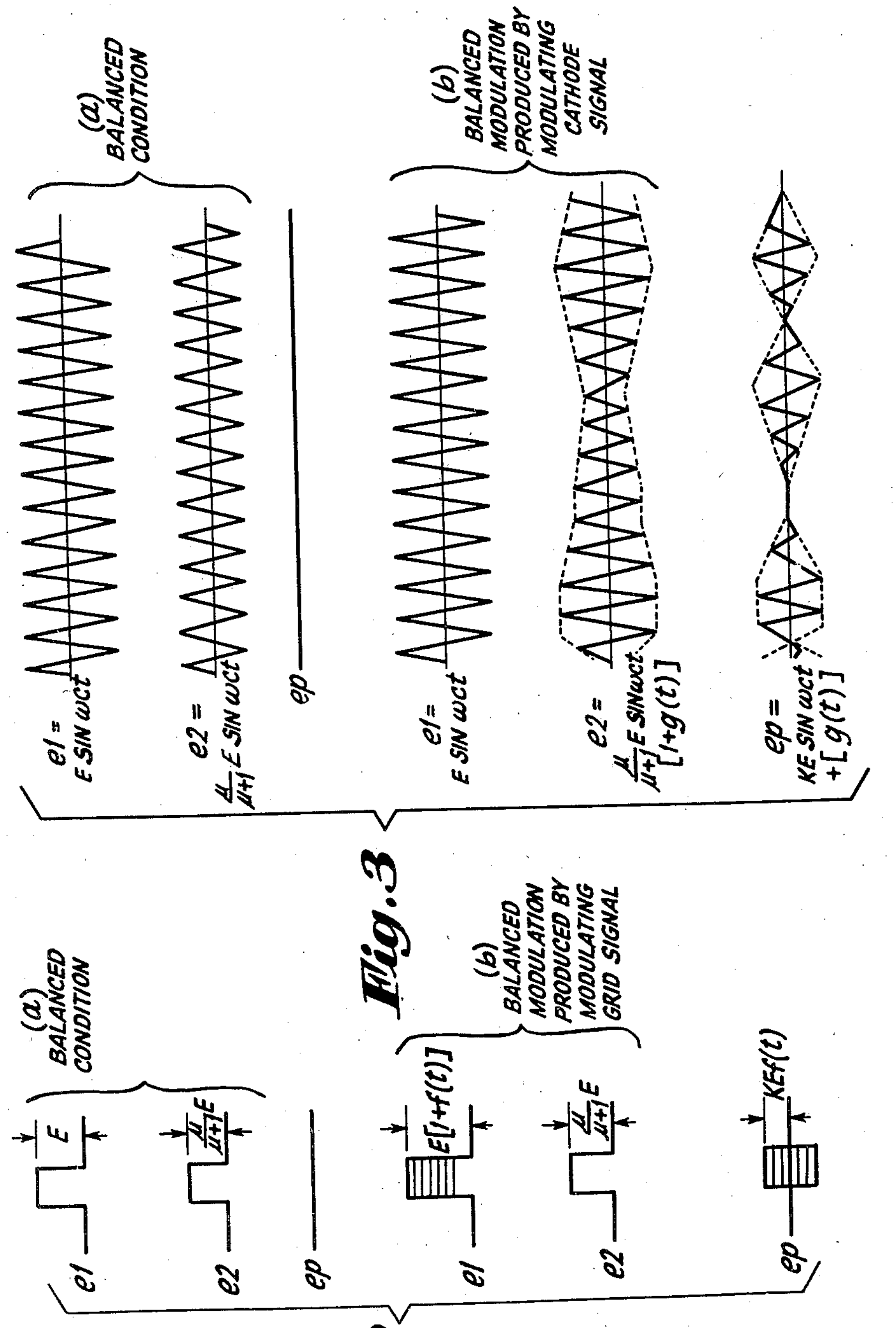

In describing my invention, reference will be made to the attached drawings where, Fig. 1 illustrates by circuit element and circuit element connections and in part schematically a balanced modulator arranged for operation in accordance with my invention, while Figs. 2 and 3 are current curves used to illustrate the operation of the arrangement of Fig. 1, and Fig. 4 is a modification of the arrangement of Fig. 1.

In Fig. 1, T is an electron discharge device having electrodes including at least an anode A, control grid $g$ and cathode K. The anode is connected by an anode load impedor such as resistor RP to the positive terminal of a direct current source, the negative terminal of which is grounded being thereby connected through source $e2$ and resistor RK to the cathode K. The source $e2$ may be oscillations of pulse form as in the second line of Fig. 2 or of sine wave form as in line 2 of Fig. 3 and the connections in said source include a continuous D.-C. connection between the cathode K and ground. The control grid $g$ is coupled to the cathode (through ground) by way of a source $e1$. The source $e1$ may also be of pulse wave form as in line 1 of Fig. 2 or of substantially sine wave form as in line 1 of Fig. 3. Here again, the apparatus in $e1$ may include a direct current biasing circuit for the grid $g$ or RK may be so selected that additional bias is not required. A modulator 10 may be connected to the source $e1$ to modulate the magnitude thereof while the modulator 12 may be connected to the source $e2$ to modulate the magnitude thereof.

The potentials $e1$ and $e2$ are of substantially like phase on the grid $g$ and cathode K respectively. The magnitudes of the two potentials $e1$ and $e2$ are so adjusted that their effects on the plate current within the tube are equal and because of the cophasal applications of the potentials noted above are opposite. As a consequence, no plate current flows, as a result of this application of the potentials $e1$ and $e2$. If linearity of the tube be assumed this condition will obtain when $$e1=\frac{\mu+1}{\mu}e2$$

If either potential $e1$ or $e2$ is now amplitude modulated about its mean value by closing S, or S1 or both are modulated by different amounts by closing S and S1, the resultant plate current is modulated. With pure sine wave modulation, if both are modulated equally in magnitude but antiphasally plate current modulation takes place. This change of current through the resistor RP produces positive and negative going potentials on the anode A which appear in the output circuit.

The means for modulating the potential $e1$ and/or the potential $e2$ are shown diagrammatically at 10 and 12, Fig. 1. The apparatus in $e1$ and in $e2$ includes potential magnitude controlling means so that the opposed phase relation of the potentials described above and the proper magnitude thereof may be obtained. The output consists of the side bands alone, since the carrier is eliminated by virtue of the balanced modulation in the absence of modulation or in the presence of zero modulation.

When pulse energy is to be modulated, the same may be as represented in lines 1 and 2 of Fig. 2. Note that the potentials are in phase and of a magnitude such as to have like effects on the plate current. The output is then constant as indicated by *ep* in line 3 of Fig. 2. When modulation is applied to the potential *e1*, fed to the grid *g*, the magnitude thereof varies as represented in line 4 of Fig. 2. If no modulation is applied to the potential *e2* it is as represented in line 5 of Fig. 2. The resulting A.-C. output potential *ep* is as represented in line 6 of Fig. 2. The anode potential varies at the pulse rate and the variations are within an envelope which represents the modulation applied to the pulse energy. The original pulses, going in one direction only from the base line, have been converted to a series of pulses going in both directions from the base line. The anode swings positive and negative of the positive base line, but does not go negative relative to ground. When by virtue of the modulating signal, the pulse *e1* is larger than the pulse *e2*, the net grid to cathode voltage is positive (assuming *e1* and *e2* positive, but they are not limited to this), the plate current increases during the pulse interval, and the anode voltage drop becomes greater and hence, the anode potential becomes less during this interval than during the interval when there is no pulse. When *e1* is smaller than *e2* (during a different part of the modulation cycle), the net grid to cathode voltage is negative during the pulse, the plate current will decrease, and the anode voltage rise from its value when no pulse is present.

When voltages of carrier wave frequency and substantially sine wave form are supplied at *e1* and *e2*, the same may be as represented in lines 1 and 2 of Fig. 3 in which case, a balanced output represented by zero A.-C. voltage *ep* of constant magnitude as shown in line 3 of Fig. 3 appears at the anode A. Now assume modulation is applied to *e2* as represented in line 5 of Fig. 3 and the carrier at *e1* is unmodulated, then the output *ep* will be as represented in line 6 of Fig. 3. If modulation is applied in phase opposition to both sources *e1* and *e2*, the output will again be modulated in a similar manner. In both cases, the carrier is suppressed and side band energy as represented in line 6 of Figs. 2 and 3 is provided for use as desired.

In the embodiment of Fig. 4, I have added a coupling stage 50 for applying the modulation to one of the voltages, i. e., *e1*, applied to the balanced modulator grid. To simplify the description, I have applied reference letters and numerals primed to circuit elements voltages, etc., in Fig. 4 which are found in Fig. 1. The pulse input is applied between lines 61 and ground through a coupling capacitor 59 to a voltage dividing network comprising resistor RK' and variable resistor 60. This pulse appears across the resistor RK' of tube T' and is designated *e2'*. The pulse input at line 61 is positive going and in one embodiment has a magnitude of about ten volts peak and a duration of several micro-seconds. These pulses are also applied through condenser 52 to another voltage divider comprising resistor 51 and resistor 53 in parallel with the anode to cathode impedance of the coupling tube 50. This pulse is fed to the grid *g'* of tube T' and is designated $e_1'$. The grid 55 of tube 50 is supplied by modulating signals of sinusoidal wave form between line 62 and ground by way of capacitor 58. In the embodiment being described, the modulation input at 62 had a peak-to-peak magnitude of two volts. Resistor 57 supplies a D.-C. return circuit for grid 55, being connected to a negative source of potential at its lower end. In operation, the pulse source, condenser 59 and resistors 60 and RK' act as a source $e'_2$. The grid to cathode circuit of tube 50 serves as a modulator for source *e1'*. The remaining part of the circuit comprising anode resistor R'*p* and the output connections are as described hereinbefore.

With pulses and modulation as described above and a 6C4 tube at 50 and a 6C4 tube at T' the circuit resistors and capacitors had the following values:

| | | |
|---|---|---|
| 51 | ohms | 12,000 |
| 53 | do | 100,000 |
| 57 | do | 220,000 |
| 60 | do | 2,000 |
| RK' | do | 1,000 |
| R'*p* | do | 10,000 |
| 52 | microfarads | .01 |
| 58 | do | .04 |
| 59 | do | .1 |
| 63 | do | .01 |

When no modulating signal is applied at line 62, the pulse signals are reduced in magnitude through divider resistor 51 and the anode to cathode resistance of tube 50. The resistor 53 provides for a complete D.-C. path through the circuit comprising it and tube 50. In the embodiment shown, the resistor 53 is returned to ground. This is possible because the applied pulses are positive going. If negative going signal or signals going in both directions, such as sinusoidal signals, were to be modulated, resistor 53 would be returned to a positive voltage, and the connection from anode 54 of tube 50 to grid *g'* of tube T' would be made through a capacitor and grid leak, in order to isolate the D.-C. component of voltage on plate 54 from grid *g'*. It is necessary to supply this positive bias in such cases, in order to keep the tube 50 conductive throughout the signal cycle, so that the anode plate resistance remains substantially constant.

The pulse signals are also reduced in magnitude by divider resistors 60 and RK'. The value of resistor 60 is varied so as to adjust the voltage applied to cathode K' to such a value as to balance the voltage applied to grid *g'* when no modulating signal (or a selected level of modulation signal) is applied to grid 55, in such a manner that no variation in current from anode A' to cathode K' will occur. Under these condtions, the voltage drop across R*p*' will remain constant, and there will be no signal from the output terminals.

When a modulating voltage input is applied to line 62, and transferred through condenser 58 to grid 55 of tube 50, the anode to cathode resistance of tube 50 varies in accordance with the applied signal, becoming smaller as the modulating signal goes positive, and increasing as the modulating signal goes negative. This changes the resistance ratios in the voltage divider (resistor 51, and anode to cathode resistance of tube 50) in such a manner that the amplitude of *e1'* is varied by the modulating input, increasing as the latter decreases, and vice versa. This variation in amplitude of *e1'* upsets the balance in tube T' and gives rise to balanced modulated outputs as described in connection with Fig. 1.

What is claimed is:

1. A balanced modulator including an electron discharge device having electrodes including a cathode, an anode and a control grid, an output circuit including an impeder coupled to the anode of said tube, a source of signals the magnitude of which varies at a recurring rate connected to the cathode of said tube, a second source of signals the magnitude of which varies at a like rate coupled to the control grid of said tube, the said signals being applied substantially co-phasally to the control grid and cathode of said tube and of relative magnitudes such that their effects on the anode potential substantially compensate, and apparatus for relatively modulating the magnitudes of the two signals.

2. A balanced modulator including an electron discharge device having electrodes including a cathode, an anode and a control grid, an output circuit including an impeder coupled to the anode of said tube, a source of potentials the magnitude of which varies between substantially constant values at a recurring rate connected to the cathode of said tube, a second source of potentials the magnitude of which varies between substantially constant values at a like rate coupled to the control grid of said tube, the said potentials being applied substantially co-phasally to the control grid and cathode of said tube and of relative magnitudes such that their effects on the anode potential substantially compensate, and apparatus for modulating the magnitude of at least one of said potentials.

3. A modulator as recited in claim 2 wherein said first source is modulated in magnitude.

4. A modulator as recited in claim 2 wherein said second source is modulated in magnitude.

5. A modulator as recited in claim 2 wherein apparatus is included to modulate the magnitude of the other of said potentials anti-phasally with respect to the modulation of said one of said potentials.

6. A modulator including a multi-element electron control device having first, second and third electrodes, an output circuit including an impeder coupled to said first electrode, a source of potentials the magnitude of which varies at a recurring rate coupled to said second electrode, a second source of potentials the magnitude of which varies at a like rate coupled to said third electrode, the said potentials being applied substantially co-phasally to the second and third electrodes of said tube and of relative magnitudes such that their effects on the potential of the first electrode substantially compensate, and apparatus for modulating the magnitude of at least one of said potentials.

7. A modulator including a multi-element electron control device having three electrodes, a source of potentials the magnitude of which varies at a recurring rate coupled to one of said electrodes, a second source of potentials the magnitude of which varies at a like rate coupled to another of said electrodes, the said potentials being applied substantially co-phasally to their corresponding electrodes and of relative magnitudes such that their effects on the potential of the remaining electrode substantially compensate, apparatus for modulating the magnitude of at least one of said potentials, and an output circuit including an impeder coupled to said device.

THOMAS T. N. BUCHER.

REFERENCES CITED

The following references are of record in the file of this patent:

UNITED STATES PATENTS

| Number | Name | Date |
|---|---|---|
| 2,441,127 | Atkins | May 11, 1948 |